US012457499B2

(12) United States Patent
Kauffmann et al.

(10) Patent No.: US 12,457,499 B2
(45) Date of Patent: Oct. 28, 2025

(54) HOME TOY MAGIC WAND MANAGEMENT PLATFORM INTERACTING WITH TOY MAGIC WANDS OF VISITORS

(71) Applicants: Google LLC, Mountain View, CA (US); Alejandro Kauffmann, San Francisco, CA (US); Dev Bhargava, San Francisco, CA (US)

(72) Inventors: Alejandro Kauffmann, San Francisco, CA (US); Dev Bhargava, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 408 days.

(21) Appl. No.: 18/010,164

(22) PCT Filed: Aug. 31, 2020

(86) PCT No.: PCT/US2020/048677
§ 371 (c)(1),
(2) Date: Dec. 13, 2022

(87) PCT Pub. No.: WO2022/046088
PCT Pub. Date: Mar. 3, 2022

(65) Prior Publication Data
US 2023/0232237 A1     Jul. 20, 2023

(51) Int. Cl.
*H04W 12/55* (2021.01)
*A63J 21/00* (2006.01)
(Continued)

(52) U.S. Cl.
CPC ............. *H04W 12/55* (2021.01); *A63J 21/00* (2013.01); *H04W 12/63* (2021.01); *H04W 12/69* (2021.01)

(58) Field of Classification Search
CPC ...... H04W 12/55; H04W 12/63; H04W 12/69; H04W 12/68; H04W 12/50; A63J 21/00
See application file for complete search history.

(56) References Cited

U.S. PATENT DOCUMENTS 6,175,864 B1 * 1/2001 Addison ............. G06F 9/45512
709/219
7,277,964 B2 * 10/2007 Adelaide ................ H04N 19/42
710/33
(Continued)

FOREIGN PATENT DOCUMENTS

EP     3687208     7/2020

OTHER PUBLICATIONS

International Preliminary Report on Patentability for Application No. PCT/US2020/048677, mailed Mar. 9, 2023, 9 pages.
(Continued)

*Primary Examiner* — Dominic E Rego
(74) *Attorney, Agent, or Firm* — DORITY & MANNING P.A.

(57) ABSTRACT

The present disclosure is directed to facilitating the pairing of a visitor interactive object. An example method includes receiving, by a first interactive object from one or more sensors, data indicative of a visitor interactive object identifier associated with the visitor interactive object. The method includes generating, by the first interactive object, a pairing communication for the visitor interactive object that includes the visitor interactive object identifier and instructions to pair with the visitor interactive object. The method includes communicating, by the first interactive object, the pairing communication to a central computing device. The central computing device can be temporarily paired with the visitor interactive object based on the pairing communication. For instance, the method can include receiving, by the central computing device, the visitor pairing communica-
(Continued)

tion, generating a temporary visitor profile based on the visitor interactive identifier, and establishing the temporary wireless connection with the visitor interactive object.

19 Claims, 11 Drawing Sheets

(51) Int. Cl.
*H04W 12/50* (2021.01)
*H04W 12/63* (2021.01)
*H04W 12/69* (2021.01)

(56) References Cited

U.S. PATENT DOCUMENTS

| | | | | |
|---|---|---|---|---|
| 8,742,686 B2* | 6/2014 | Zampini, II | ......... | H05B 47/155 315/297 |
| 9,094,569 B1* | 7/2015 | Humphries | ............ | G06Q 20/14 |
| 9,398,452 B1* | 7/2016 | Upp | ........................ | H04L 63/18 |
| 9,990,786 B1* | 6/2018 | Ziraknejad | ............... | G06F 21/45 |
| 10,477,600 B1* | 11/2019 | Willis | ................... | H04W 76/11 |
| 10,582,351 B2* | 3/2020 | Surnilla | ................ | H04W 8/183 |
| 10,768,016 B2* | 9/2020 | Magley | ................. | H04W 8/005 |
| 10,893,040 B2* | 1/2021 | Mahiddini | .......... | H04L 63/0838 |
| 2002/0047861 A1* | 4/2002 | LaBrie | ............... | G06Q 30/0237 715/733 |
| 2002/0087867 A1* | 7/2002 | Oberle | ................ | H04L 63/0853 713/183 |
| 2004/0113778 A1* | 6/2004 | Script | ..................... | G01P 13/00 340/545.1 |
| 2005/0208940 A1* | 9/2005 | Takase | ................... | H04L 67/30 455/435.1 |
| 2006/0116117 A1* | 6/2006 | Takase | .................. | H04M 7/006 455/420 |
| 2009/0092134 A1* | 4/2009 | Herrera Schuvab | ........................ | G06Q 30/0283 705/400 |
| 2009/0253416 A1* | 10/2009 | Lee | ........................ | H04H 60/72 455/414.1 |
| 2010/0302025 A1* | 12/2010 | Script | ..................... | G08B 13/08 340/545.5 |
| 2011/0028094 A1* | 2/2011 | Masuda | ................ | H04W 12/06 455/41.2 |
| 2012/0036181 A1* | 2/2012 | Isidore | .................... | H04L 51/52 709/203 |
| 2013/0097233 A1* | 4/2013 | Raman | ................... | G06Q 50/01 709/204 |
| 2014/0109204 A1* | 4/2014 | Papillon | ................. | H04L 9/3271 726/5 |
| 2014/0215564 A1* | 7/2014 | Banatwala | ............ | G06F 3/0481 726/3 |
| 2014/0267931 A1* | 9/2014 | Gilson | ............... | H04N 21/4436 348/734 |
| 2015/0004901 A1* | 1/2015 | Agiwal | ................. | H04W 76/11 455/39 |
| 2015/0042168 A1* | 2/2015 | Widmer | .................. | H02J 50/80 307/104 |
| 2015/0073642 A1* | 3/2015 | Widmer | ............. | G01C 21/3635 701/22 |
| 2015/0074408 A1* | 3/2015 | Oberheide | .............. | H04L 9/083 713/171 |
| 2015/0163843 A1* | 6/2015 | Zhu | ..................... | H04L 63/0869 455/41.2 |
| 2015/0230142 A1* | 8/2015 | Yang | ..................... | H04W 36/38 370/331 |
| 2015/0365823 A1* | 12/2015 | Evennou | ............... | G06F 16/955 380/283 |
| 2016/0067600 A1* | 3/2016 | Barney | ..................... | A63F 9/24 463/37 |
| 2016/0182762 A1* | 6/2016 | Eum | .................. | H04N 1/00307 358/1.14 |
| 2017/0104352 A1* | 4/2017 | Stratton | ................ | H02J 7/0044 |
| 2017/0272935 A1* | 9/2017 | Lei | ........................ | H04L 67/303 |
| 2017/0289790 A1* | 10/2017 | Singh | ..................... | H04W 8/205 |
| 2017/0300678 A1* | 10/2017 | Metke | ................. | H04W 12/068 |
| 2018/0190056 A1* | 7/2018 | Desinor, Jr. | ......... | G07C 9/00309 |
| 2018/0240275 A1* | 8/2018 | Clements | ............... | G16H 80/00 |
| 2019/0262516 A1* | 8/2019 | Monty | ................ | A61M 3/0262 |
| 2019/0320309 A1* | 10/2019 | Carlson | ................. | H04L 67/141 |
| 2020/0021551 A1* | 1/2020 | Buck, Jr. | ................. | H04W 4/80 |
| 2020/0120202 A1* | 4/2020 | Jakobsson | ............ | H04L 63/105 |
| 2021/0136083 A1* | 5/2021 | Gordon | ................. | H04L 63/105 |
| 2021/0150587 A1* | 5/2021 | Rizvi | ................. | G06Q 30/0267 |
| 2021/0264356 A1* | 8/2021 | Gryniewicz | ....... | G06Q 10/0834 |

OTHER PUBLICATIONS

EE Times, "Make the Most of Bluetooth LE Advertising Mode", https://www.eetimes.com/make-the-most-of-bluetooth-le-advertising-mode/, retrieved on Jan. 31, 2023, 5 pages.

Townsend et al., "Getting Started with Bluetooth Low Energy: Tools and Techniques for Low-Power Networking", 2014 (First Edition O'Reilly Media, Inc. https://dl.acm.org/doi/10.5555/2621948, retrieved on Jan. 31, 2023, 5 pages.

International Search Report for Application No. PCT/US2020/048677, mailed on Apr. 6, 2021, 3 pages.

* cited by examiner

HOME TOY MAGIC WAND MANAGEMENT PLATFORM INTERACTING WITH TOY MAGIC WANDS OF VISITORS

PRIORITY CLAIM

This application is based upon and claims the right of priority under 35 U.S.C. § 371 to International Application No. PCT/US2020/048677 filed on Aug. 31, 2020, which is incorporated by reference herein.

FIELD

The present disclosure relates generally to pairing electronic devices. More particularly, the present disclosure relates to pairing electronic interactive devices with central devices for leveraging the computing resources of the central device.

BACKGROUND

Pairing processes can be utilized to create a communication linkage between computing devices. Once paired, the computing devices can communicate to share data and/or initiate certain actions. Pairing with unknown, or visiting, devices can cause security risks for the computing devices.

SUMMARY

Aspects and advantages of embodiments of the present disclosure will be set forth in part in the following description, or can be learned from the description, or can be learned through practice of the embodiments.

Aspects of the present disclosure are directed to a computer-implemented method for device pairing. The method includes receiving, by a first interactive object from one or more sensors, data indicative of a visitor interactive object identifier associated with a visitor interactive object. The method includes generating, by the first interactive object, a pairing communication for the visitor interactive object. The pairing communication includes the visitor interactive object identifier. The method includes communicating, by the first interactive object, the pairing communication to a central computing device. The central computing device is temporarily paired with the visitor interactive object based, at least in part, on the pairing communication.

Another aspect of the present disclosure is directed to a central computing device including one or more processors and a memory storing instructions that when executed by the one or more processors cause the central computing device to perform operations. The operations include receiving a visitor pairing communication from a first interactive object wirelessly connected to the central computing device. the visitor pairing communication includes a visitor interactive object identifier associated with a visitor interactive object. The operations include generating, based at least in part on the visitor interactive object identifier, a temporary visitor profile for the visitor interactive object. And, the operations include establishing, based at least in part on the visitor pairing communication, a temporary wireless connection with the visitor interactive object.

Yet another aspect of the present disclosure is directed to one or more non-transitory computer-readable media including instructions that when executed by one or more computing devices cause the one or more computing devices to perform operations. The operations include receiving an infrared signal indicative of a visitor interactive object identifier associated with a visitor interactive object. The operations include generating a pairing communication for the visitor interactive object. The pairing communication includes the visitor interactive object identifier. And, the operations include communicating the pairing communication to a central computing device. The central computing device is temporarily paired with the visitor interactive object based, at least in part, on the pairing communication.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
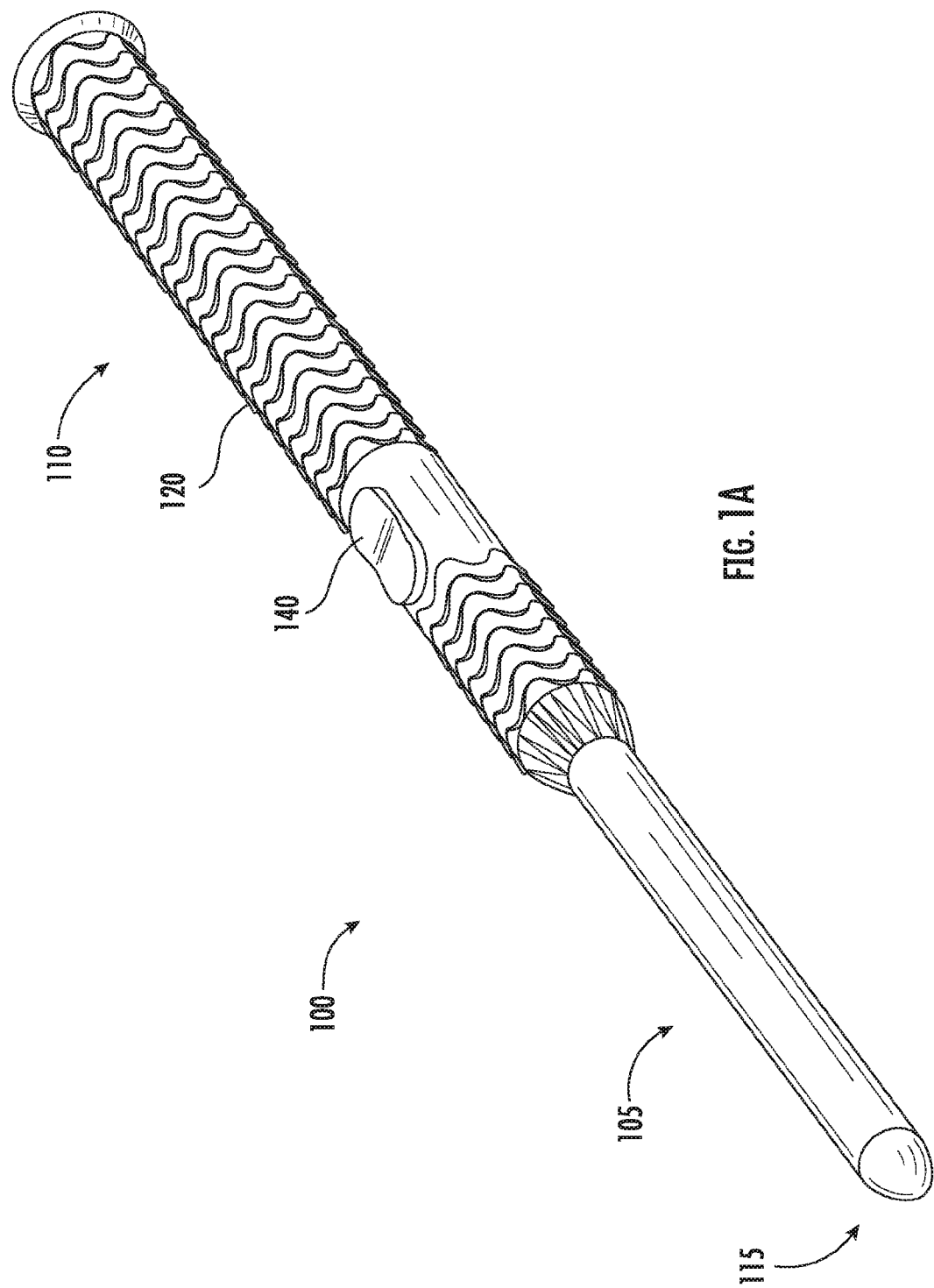
FIGS. 1A-E depict an example interactive object and an example hardware architecture of an interactive object according to example aspects of the present disclosure.

Example aspects of the present disclosure are directed to improved pairing of electronic devices such as between an interactive toy and a central device. For example, one or more users may be located within the same room (e.g., of a store, a user's house, etc.). Each user may have an interactive object. The interactive object can be, for example, a hand-held electronic smart wand with a hardware architecture that enables inter-device communications as well as motion sensing. The interactive object may be paired with a central device (e.g., a user's phone, a store's terminal device, a house networking device, etc.) to help extend the functionality of the interactive object by allowing it to leverage the computing resources of the central device. This can include, for example, gesture-recognition software running on the central device that can allow a user to perform an action (e.g., make a purchase, engage in a collaborative game, etc.) by making a particular gesture with the paired interactive object (e.g., a spell motion with the electronic smart wand, etc.). At times, multiple interactive objects may be paired to one central device to allow interactions between the interactive objects and the central device.

The technology of the present disclosure can help temporarily pair multiple visitor interactive objects with a central device previously paired with a first interactive object. For example, the first interactive object can be associated with a user profile (e.g., administrator account) of the central device. The first interactive object can receive a first input (e.g., a physical input, movement, audio input, etc.) from a first user to initiate a listening mode for one or more sensors (e.g., an infrared sensor, etc.). During the listening mode, the first interactive object can receive a visitor interactive object identifier from a visitor interactive object. In response, the first interactive object can generate a pairing communication for the visitor interactive object and communicate the pairing communication to the central device. The central device can receive the pairing communication, generate a temporary visitor profile for the visitor interactive object, and establish a temporary wireless connection with the visitor interactive object. The central device can receive data indicative of an action performed by one of the first interactive object or the visitor interactive object, determine which device performed the action, and initiate a response to the action. The response to the action can be different based on the object (e.g., first interactive object, visitor interactive object, etc.) that performed the action and/or one or more privileges of a profile (e.g., user profile, visitor profile, etc.) associated with the respective object. In this way, the technology of the present disclosure improves the interoperability of multiple interactive devices, while reducing the computing resources devoted to and increasing security of pairing multiple interactive devices with one central device.

More particularly, an interactive object can be a hand-held electronic device that includes various hardware components. For instance, the interactive object can include a wand-like form factor. The wand-like form factor can include a generally cylindrical outer casing with a first end (e.g., including a wand tip, etc.) and a second end (e.g., including a wand handle, etc.). The generally cylindrical outer casing can include various diameters such that, for example, it is tapered from the second end to the first end. In some implementations, the interactive object may include another type of form-factor such as, for example, a spherical form-factor.

The outer casing of the interactive object can form a cavity, which can include various hardware components for performing the functions of the interactive object. As an example, the interactive object can include hardware components such as one or more infrared emitters, infrared receivers, etc. that enable the interactive object to transmit and/or receive one or more infrared signals. In addition, the hardware components can include, for example: a sensor/device (e.g., inductive sensor, button, etc.) for detecting user input, an inertial measurement unit (e.g., accelerometer, gyroscope, etc.), haptic actuator (e.g., eccentric rotating mass (ERM) motor, etc.), communication interface (e.g., Bluetooth chip, antenna, etc.), microcontroller, power source (e.g., battery with associated charging hardware, etc.), output device(s) (e.g., LED/other lights, speakers, etc.), processor(s), memory, and/or other components. The hardware architecture of the interactive object can allow it to perform various functions including, for example, pairing with another device, facilitating the pairing operation between two other devices, and making/detecting a gesture action, as further described herein.

A first interactive object can be previously paired with a central computing device. The first interactive object can be authorized for input to the central device based on a user account of the central device. For example, the first interactive object can be associated with a home profile including one or more home privileges associated with the first interactive object. The home profile, for example, can include an administrative account for the central device. The home privilege(s) can include one or more administrative privileges. By way of example, one or more home privilege(s) can include one or more activities associated with the privacy or the security of the central device. For instance, the central device can include a user's mobile device, a store's terminal device, a home networking device, and/or any other computing device. The home privileges can include accessing one or more contacts of a mobile device, updating an inventory for a store device, accessing a lighting appliance through a home networking device, etc.

The first interactive object can facilitate the pairing of visitor interactive objects to the central device such that the visitor interactive objects can interact with the central device (and/or one or more other objects paired with the central device such as the first interactive object) without having access to the home profile (and/or the permissions thereof) of the central device. To do so, a first user of the first interactive object can provide user input to the first interactive object. For example, the first interactive object can detect user input with the first interactive object. The user input can include a physical contact (e.g., a touch input, squeezing action, etc.) with the first interactive object, a movement (e.g., a gesture, a particular movement pattern, etc.) of the first interactive object, an audio input (e.g., a voice command, etc.) to the first interactive object, etc.

In response to detecting the user input, the first interactive object can initiate a listening mode associated with one or more sensors of the first interactive object. For instance, the listening mode can be associated with an infrared receiver of the first interactive object. The first interactive object can receive, from one or more sensors such as the infrared receiver, data indicative of a visitor interactive object identifier associated with a visitor interactive object. The visitor interactive object identifier, for example, can include a unique identifier corresponding to a visitor interactive object that is disconnected from the central device. For instance, the data indicative of the visitor interactive object identifier can include an infrared signal. In such a case, the first interactive object can receive, from the infrared sensor, the data indicative of the visitor interactive object identifier during the listening mode.

In some implementations, the visitor interactive object can provide the data indicative of the visitor interactive object identifier to the first interactive object. For example, a second user of the visitor interactive object can provide second user input (e.g., a physical contact, movement, audio input, etc.) to the visitor interactive object. In response, the visitor interactive object can provide the data indicative of the visitor interactive object identifier to the first interactive object. By way of example, the visitor interactive object can be configured to provide an infrared signal indicative of the visitor interactive object identifier to the first interactive object. In some implementations, the visitor interactive object can determine a connection status associated with the visitor interactive object and provide the data indicative of the visitor interactive object identifier to the first interactive object based on the connection status. For instance, the visitor interactive object can provide the data indicative of the visitor interactive object identifier to the first interactive object in the event that the visitor interactive object is in a disconnected status (e.g., disconnected from any other central device).

The first interactive object can generate a pairing communication for the visitor interactive object and the central device. The pairing communication can include the visitor interactive object identifier. The pairing communication, for example, can include a radio wave advertising packet such as a BLE advertising packet and/or any other packet including information for pairing the visitor interactive object to the central device. The first interactive object can communicate, via the established wireless connection with the central device, the pairing communication to the central device. In this manner, the central device can receive a visitor pairing communication with the information required to pair with the visitor interactive object.

For instance, the central device can receive the visitor pairing communication from the first interactive object wirelessly connected to the central device. The central device can utilize the information of the pairing communication such as, for example, the visitor interactive object identifier to establish a wireless connection with the visitor interactive object. For instance, in some implementations, the pairing communication can be configured to trigger the central device to establish a temporary wireless connection with the visitor interactive object. The central device can receive the pairing communication and, in response, establish the temporary wireless connection with the visitor interactive object. In this manner, the central device can be temporarily paired with the visitor interactive object based, at least in part, on the pairing communication.

Once paired, the interactive object(s) can leverage the computing resources of the central device to perform one or more functions. For instance, the user can physically move the interactive object(s) to perform an interactive object action. The interactive object action can include, for example, a gesture action. The gesture action can represent a spell-like motion associated with a wand. While in motion, the interactive object(s) can obtain sensor data (e.g., via an IMU, etc.) that indicates the position(s) and time(s) associated with the motion of the interactive object(s). This data can be expressed as a series of coordinate point(s) (e.g., 2D x-y coordinates, etc.) and time(s) (e.g., time durations from a t0, timestamps associated with a world clock, etc.). The interactive object(s) can provide data indicative of the interactive object action (e.g., the coordinates/times associated with the gesture action, etc.) to the central device.

The central device can perform one or more actions based at least in part on the interactive object action and/or the interactive object (e.g., the first interactive object, the visitor interactive object, etc.) that provided the data indicative of the interactive object action. For instance, the central device can obtain the data indicative of the interactive object action. The central device can process the data to identify the interactive object action and an associated central device action to be performed. By way of example, the central device can input the coordinates/times associated with the gesture action into a recognizer model. The recognizer model can be configured to analyze the coordinates/times to identify the particular interactive object action performed via the interactive object(s). The recognizer model can output data indicative of the identified interactive object action. The central device (e.g., a software application running on the device, etc.) can identify one of more functions to perform based at least in part on the interactive object action identified by the recognizer model.

In this manner, the central device can identify one or more functions associated with the physical movement of a paired interactive object. The central device can invoke at least one of the one or more functions based, at least in part, on the interactive object (e.g., the first interactive object, the visitor interactive object, etc.) that provided the data indicative of the interactive object action. For instance, the one or more functions can include ignoring the interactive object action (e.g., based on permissions associated with the interactive object that provided the data) and/or responding with a particular central device action. By way of example, a central device action can include initiating an action associated with a collaborative game, adjusting the volume of the another device, purchasing an item via an e-commerce application, activating a lighting source of the another device, capturing an image, initiating a communication (e.g., phone call, telephone call, etc.), emitting sound(s), sending a communication to adjust a parameter of another device (e.g., tuning on a home device, changing the channel of a smart television, etc.), and/or other types of functions.

For example, the central device can generate, based at least in part on the visitor interactive object identifier, a temporary visitor profile for the visitor interactive object. The temporary visitor profile can include one or more visitor privileges associated with the visitor interactive object. The one or more visitor privileges can be different from the one or more home privileges. For example, the one or more visitor privileges can be based, at least in part, on a user account associated with a user of the visitor interactive object. For example, the central device can generate the temporary visitor profile by identifying (e.g., by searching a cloud database, etc.) a user account associated with the visitor interactive object identifier. In some implementations, the one or more visitor privileges can be associated with at least one of an age of the user, a status (e.g., a level in a collaborative game, a delinquency status, etc.) of the user, and/or a history (e.g., a purchase history, etc.) of the user. In addition, or alternatively, the visitor privilege(s) can include restrictions based on the one or more home privileges. For instance, the one or more home privileges can include one or more exclusive home privileges such that any visitor interactive object connected with the central device will not be granted the one or more exclusive home privileges.

The central device can receive interaction data indicative of an interactive object action for at least one of the first interactive object and/or the visitor interactive object. The central device can identify the interactive object that performed the interactive object action based, at least in part, on the interaction data (e.g., via an interactive object identifier of the interaction data). And, the central device can initiate a response to the interactive object action based on the interactive object that performed the interactive object action. For example, the response can be determined based at least in part on the privileges associated with the profile associated with the interactive object that performed the interactive object action.

As an example, the interactive object can be the visitor interactive object. In such a case, the central device can determine a visitor response to the interactive object action based at least in part on the one or more visitor privileges of the visitor profile associated with the visitor interactive object and initiate the visitor response to the object action. As another example, the interactive object can be the first interactive object. In such a case, the central device can determine a home response to the interactive object action based at least in part on the one or more home privileges of the home profile associated with the first interactive object and initiate the home response to the object action. The visitor response can be different from the home response, for example, in the event that a visitor profile does not include privileges for performing an action accessible to the home profile.

The central device can terminate the temporary wireless connection with the visitor interactive object based on one or more factors such as, for example, a location associated with the visitor interactive object (e.g., indicating that the visitor interactive object is out of range, etc.), a time period (e.g., the expiration of a pairing time period, etc.), an event (e.g., the completion of a collaborative game, etc.), and/or any other factor that may affect the connection between two devices. In response to terminating the temporary wireless connection, the central device can discard the temporary visitor profile. In addition, or alternatively, the temporary visitor profile can be stored in an accessible memory at the central device.

The present disclosure provides a number of technical effects and benefits. For example, the disclosed technology can leverage an interactive object previously connected with a central device to pair a temporary interactive object to the central device. In doing so, the present disclosure can enable the pairing of devices through infrared and/or other lightweight signals. This can help save the computational resources (e.g., processing, memory, power, etc.) that would be wasted by pairing devices using conventional techniques. Moreover, the technology of the present disclosure can utilize temporary visiting profiles with selective privileges to interact with a visiting interactive object without granting full control to the central device. In this way, the pairing techniques of the present disclosure can improve computing/device security by filtering actions provided by a number of paired interactive objects according to privileges associated with those objects. For example, a first interactive object associated with an administrative account on the central device can have access to a number of privileges not available to a visiting interactive object. This can allow the visiting interactive object to be temporarily paired with the central device, for example, to play a collaborative game with the first interactive object, while not sacrificing the security of the central device. Ultimately, the technology of the present disclosure provides effective, computationally efficient, and secure pairing processes, systems, and devices.

FIGS. 1A-E depict an example interactive object and an example hardware architecture of an interactive object according to example aspects of the present disclosure. For example, FIG. 1A depicts an example interactive object 100. The interactive object 100 can be a hand-held electronic device. The interactive object 100 can be an interactive toy (e.g., an electronic smart wand toy, etc.). For instance, the interactive object 100 can include a wand-like form factor. The wand-like form factor can include a generally cylindrical shape. In some implementations, the wand-like form factor of the interactive object 100 can include one or more other shapes (e.g., square, rectangular, hexagonal, octagonal, etc.). In some implementations, the interactive object 100 may include another type of form-factor such as, for example, a spherical form-factor. An interactive object can include any device having one or more processors and at least one sensor. For example, an interactive object may include a tablet computing device, smartphone, portable media player, etc. The interactive object 100 (and its portions/elements) can be constructed from one or more materials including, for example, polymers, metal, wood, composites, and/or one or more other materials.

The interactive object 100 can include a plurality of portions. For example, the interactive object 100 can include a first end/portion 105 and a second end/portion 110. The first end/portion 105 can include, for example, a tip 115 (e.g., of the wand, etc.). The second end/portion 110 can include a handle 120 (e.g., a wand handle, etc.). In some implementations, the handle 120 can include a material suitable for securing or comforting the grip of a user (e.g., rubber, polymer, ridged surface, padding, etc.).

Figure 1B:
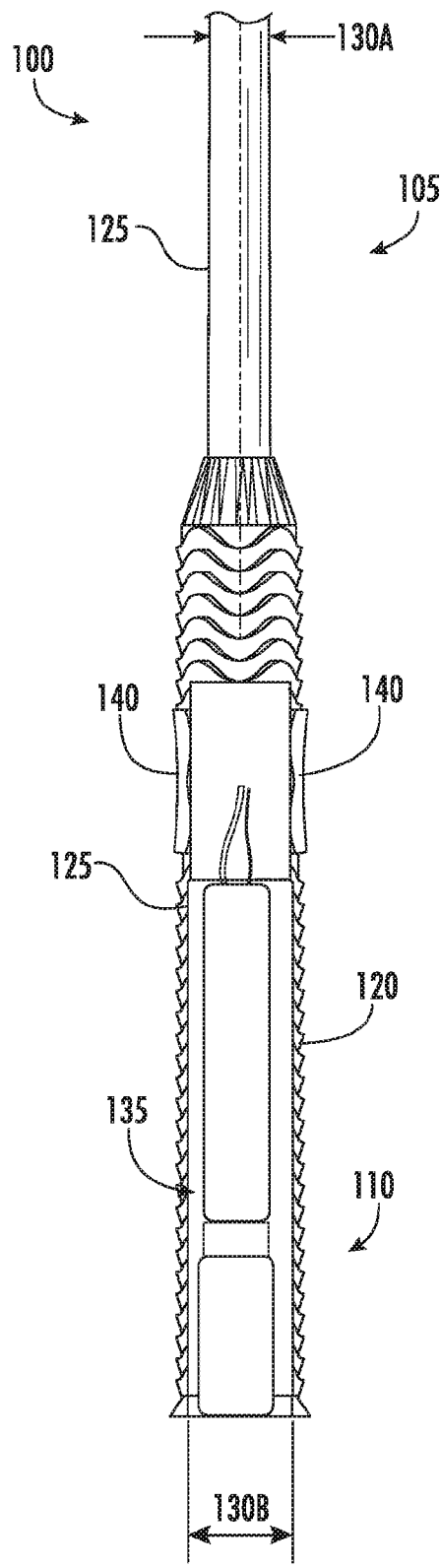

With reference to FIG. 1B, the interactive object 100 can include an outer casing 125 (e.g., an outer shell, layer, etc.) with an outer surface. In some implementations, at least a portion of the outer casing 125 can be covered by another material. This can include, for example, a grip/comfort material of the handle 120. The outer casing 125 can include one or more diameters/widths 130A-B. For example, the first end/portion 105 can be associated with one or more first diameters 130A (e.g., 15 mm, etc.). The second end/portion 110 can be associated with one or more second diameters 130B. The first diameter(s) 130A can be smaller than the second diameter(s) 130B. This can allow, for example, the interactive object 100 to appear tapered from the second end 110 to the first end 105.

In some implementations, the interactive object 100 can include one or more devices for obtaining user input. For instance, the interactive object 100 can include a user input sensor 135 on the interactive object. The user input sensor 135 can be disposed proximate to the second end 110 (e.g., closer to the second end 110 than the first end 105, etc.). For example, the user input sensor 135 can be disposed within a cavity formed by the outer casing 125 and within/under the handle 120. The user input sensor 135 can include an inductive sensor. The inductive sensor can include a coil with a metal casing surrounding the coil. The coil can be configured to detect a change in a magnetic field arising from a deformation of the metal casing. Such a deformation can be caused, for example, by a user input (e.g., a user physically gripping the handle 120 of the interactive object 100, etc.). Additionally, or alternatively, the interactive object 100 can include one or more interactive elements 140. This can include, for example, one or more buttons, touchpads, and/or other features that a user can physically contact to provide user input.

Figure 1C:
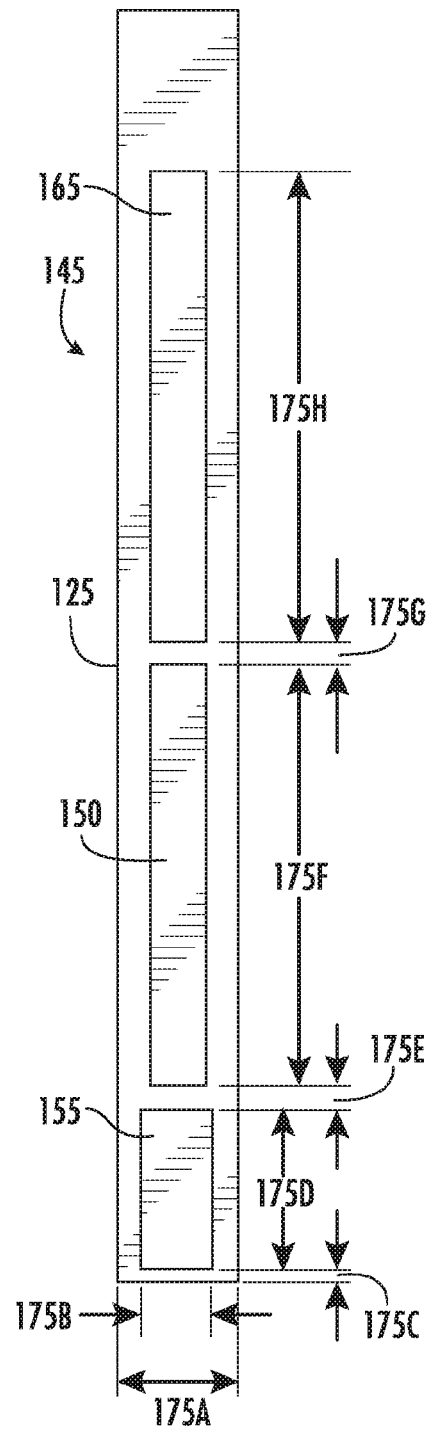
Figure 1D:
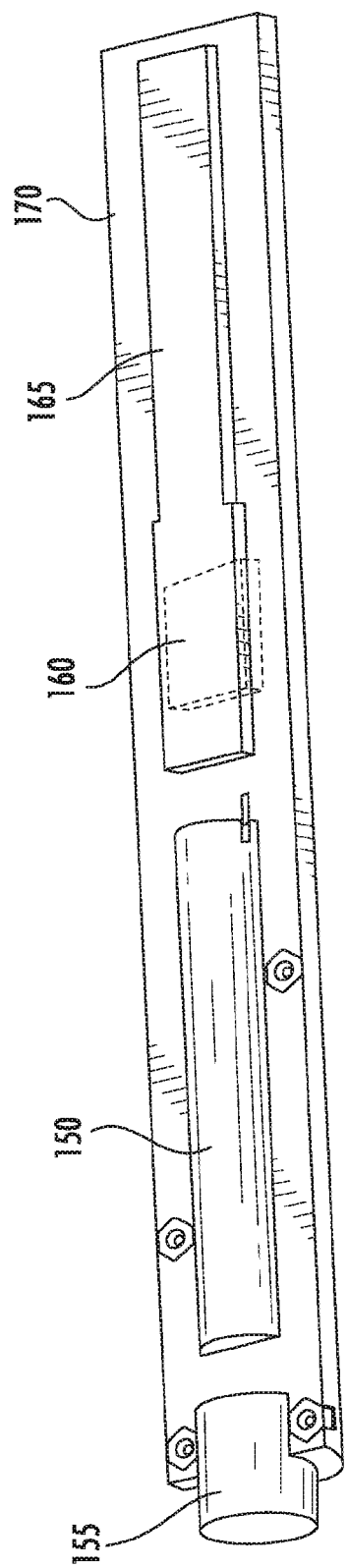

With reference to FIGS. 1C and 1D, the interactive object 100 can include a cavity 145. As described herein, the cavity 145 can be an interior cavity of the interactive object 100 formed by the outer casing 125. Various hardware components for performing the functions of the interactive object 100 can be disposed within the cavity 145. The interactive object 100 can include a power source 150 with an associated charging/fueling infrastructure 155. For example, the power source 150 can include one or more batteries (e.g., lithium-ion batteries, lithium-ion polymer batteries, and/or other batteries) and the charging/fueling infrastructure 155 can include wired and/or wireless (e.g., inductive, etc.) charging hardware. In some implementations, the interactive object 100 can include a haptic actuator 160 (shown in FIG. 1D) and a printed circuit board 165. The haptic actuator 160 can be configured to provide haptic feedback (e.g., vibration, etc.) to a user of the interactive object 100. As shown in FIG. 1D, various hardware components can be secured to/within the interactive object 100 via a support structure 170. The support structure 170 can include a mechanical spine or other structural element to which the various hardware components can be affixed. The support structure 170 can be affixed to the outer casing 125 (e.g., an interior surface thereof, etc.). In some implementations, the support structure 170 can be temporarily affixed so that it can be removed for maintenance, replacement, update, etc. of the various hardware components.

As shown in FIG. 1C, the cavity 145 and the various hardware components can include various dimensions 175A-H. For example, the cavity 145 can include a width with a first dimension 175A (e.g., 2-25 mm, etc.). This can represent the distance from one side of the interior surface of the outer casing 125 to another. The charging/fueling infrastructure 155 can include a width with a second dimension 175B (e.g., 3-15 mm, etc.), can be spaced from an end of the cavity 145 by a third dimension 175C (e.g., 0.5-3 mm, etc.), and can have a length of a fourth dimension 175D (e.g., 10-30 mm, etc.). The power source 150 can be spaced apart from the charging/fueling infrastructure by a fifth dimension 175E (e.g., 0.5-7 mm, etc.) and have a length of a sixth dimension 175F (e.g., 30-70 mm, etc.). The support structure 165 can be spaced apart from the power source 150 by a sixth dimension 175G (e.g., 0.5-7 mm, etc.) and have a length of a seventh dimension 175H (e.g., 30-70 mm, etc.).

Figure 1E:
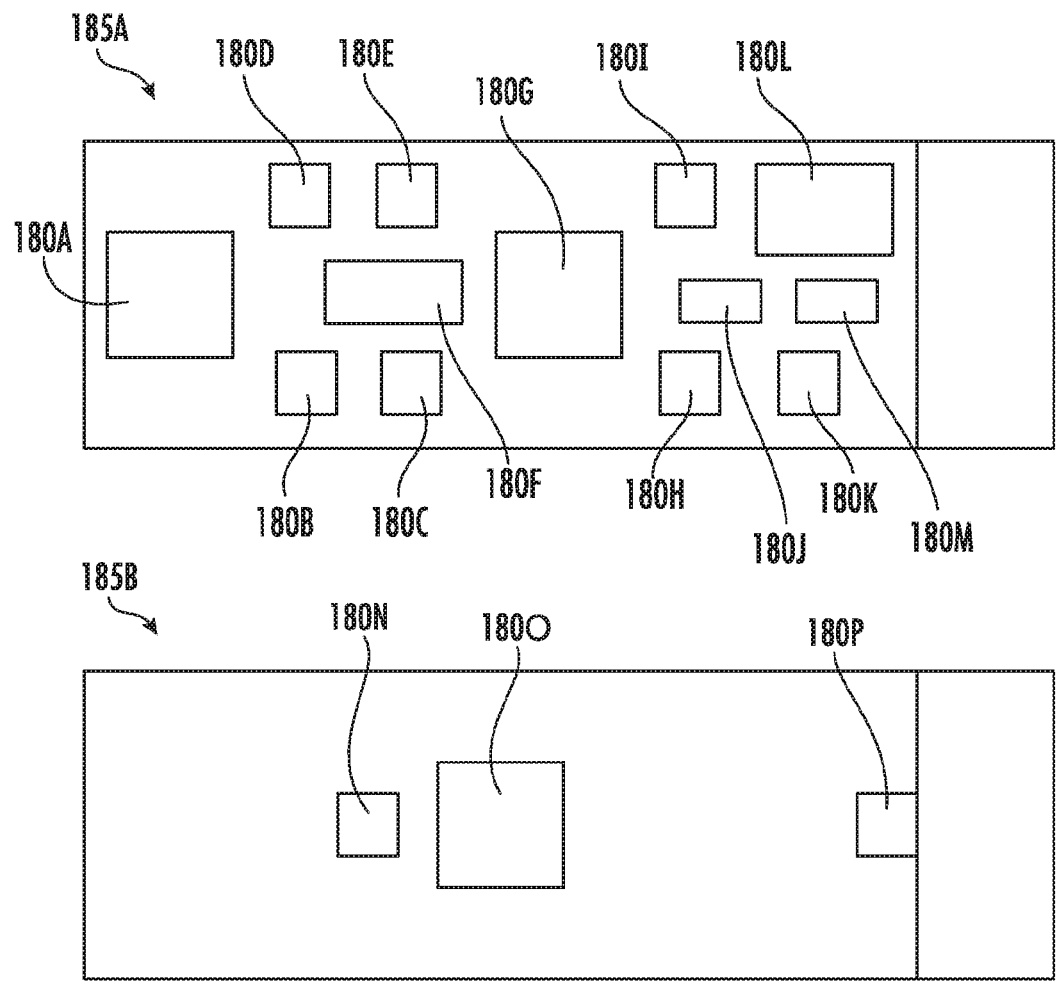

FIG. 1E depicts another diagram of example hardware components 180A-P that can be included in the interactive object 100. The hardware components 180A-P can be disposed across various layers 185A-B (e.g., top layer, bottom layer, etc.). As an example, the interactive object 100 can include one or more infrared sensors 180M. The infrared sensors can include one or more infrared receivers, transmitters, etc. that enable the interactive object 100 to transmit and/or receive one or more infrared signals. In addition, the hardware component(s) 180A-P can include, for example: charging/fueling infrastructure 180A (e.g., as described herein, etc.); device(s) 180B/K for detecting user input (e.g., inductive sensor, button(s), etc.); one or more output device(s) 180C (e.g., LED/other lights, speakers, etc.) and associated hardware 180P (e.g., connector(s), etc.); a gauge 180D configured to indicate a level of power of the interactive device 100; (e.g., a battery for wired or wireless charging, etc.); power management integrated circuit(s) 180E configured to manage the power of the interactive device 100; a power source 180F (e.g., as described herein, etc.); microcontroller(s) 180G; an inertial measurement unit 180H (e.g., accelerometer, gyroscope, etc.); haptic actuator 180I (e.g., eccentric rotating mass (ERM) motor, etc.) and associated actuator hardware 180N (e.g., connector(s), etc.); memory 180J (e.g., non-volatile memory chip, flash memory, etc.); a communication interface 180K (e.g., antenna, etc.) and associated computing hardware 180L (e.g., BLE chip, etc.); processor(s) 180O; and/or other components. In some implementations, the output device(s) 180C can be configured to output signals from the first end 105 (e.g., the tip 115, etc.) of the interactive object 100.

Figure 2:
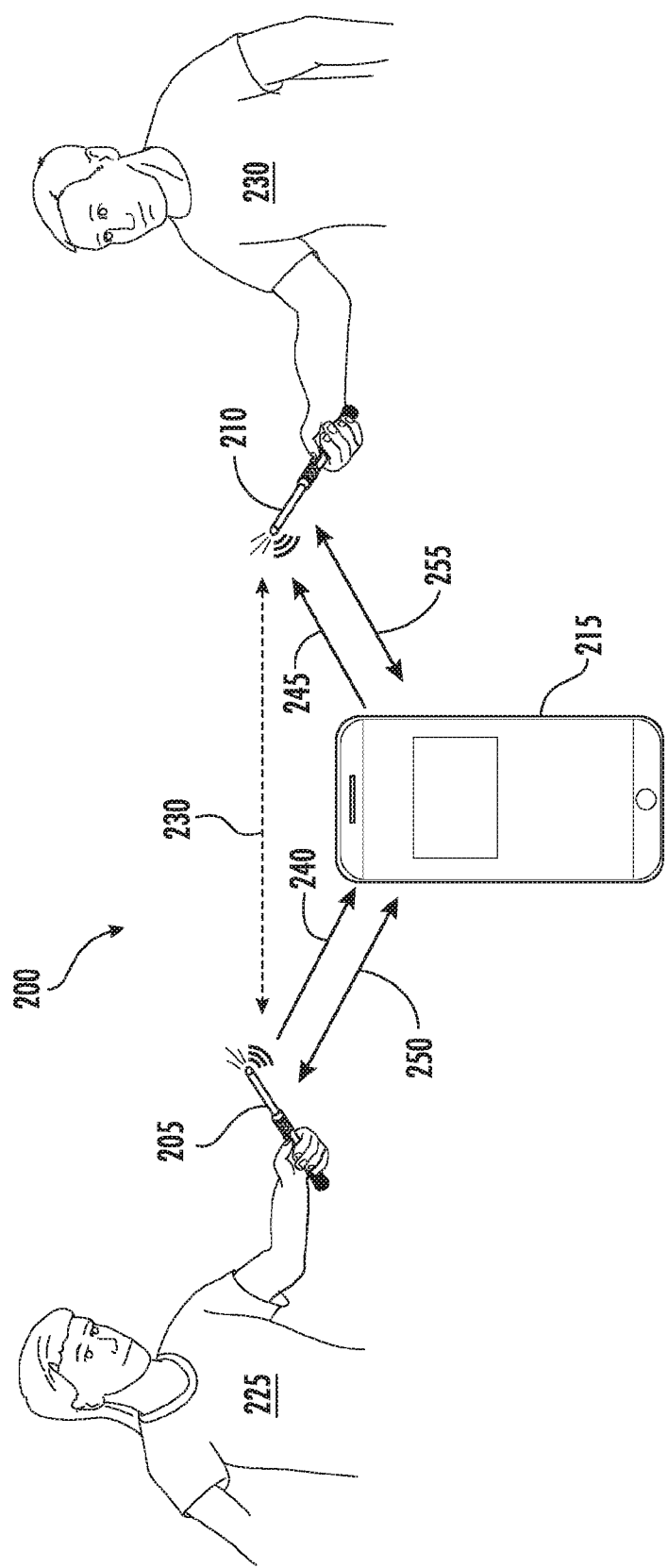
FIG. 2 depicts an example interactive object and central device ecosystem according to example aspects of the present disclosure.

The hardware architecture/components can allow the interactive object 100 to pair with another electronic device and/or facilitate the pairing between two objects. FIG. 2 depicts an example interactive object and central device ecosystem 200 according to example aspects of the present disclosure. As illustrated, the central device ecosystem 200 can include a first interactive object 205, a second interactive object 210, and a central computing device 215. The interactive object(s) 205, 210 can include the interactive object 100 described with reference to FIG. 1. In addition, or alternatively, the interactive object(s) 205, 210 can include any device with one or more hardware components for wireless communication. For example, the interactive object(s) 205, 210 can include a mobile phone, a home appliance (e.g., a smart appliance), an entertainment center (e.g., a smart television, etc.), and/or any other device capable of wireless communication.

The first interactive object 205 can be previously paired (via a first wireless connection 250) with the central computing device 215. The first interactive object 205 can be authorized for input to the central device 215 based on a user account of the central device 215. For example, the first interactive object 205 can be associated with a home profile including one or more home privileges associated with the first interactive object 205.

Figure 3:
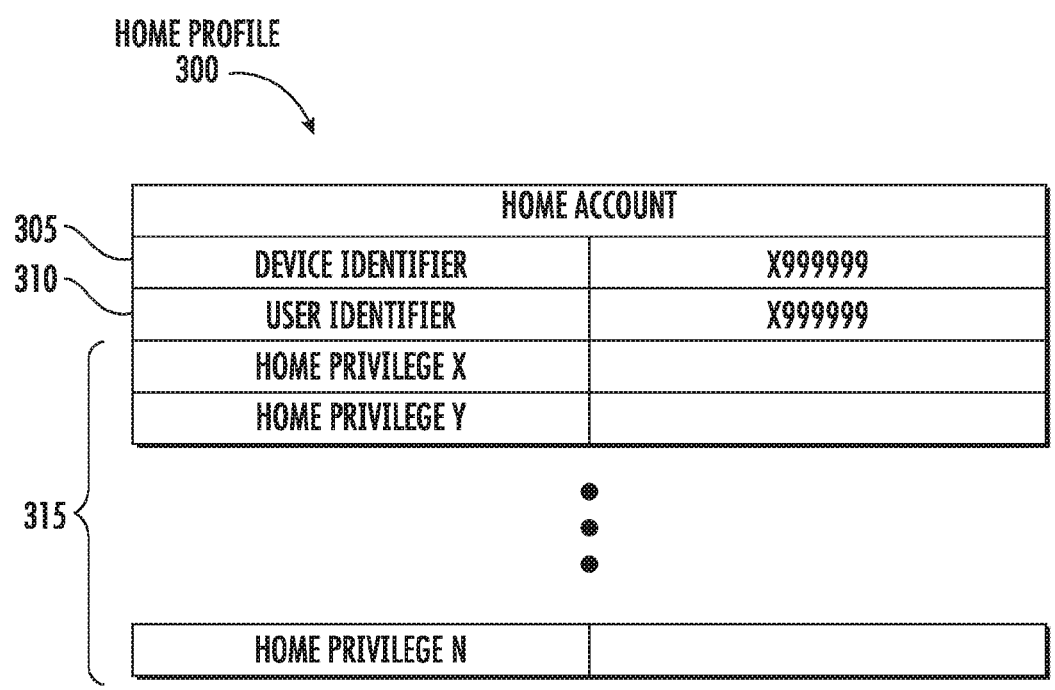
FIG. 3 depicts example contents of a home profile according to example aspects of the present disclosure.

By way of example, FIG. 3 depicts example contents of a home profile 300 according to example aspects of the present disclosure. The home profile 300 can include one or more device identifiers 305, user identifiers 310, and/or home privileges 315. The device identifiers 305, for example, can identify one or more authorized device(s) at the central device 215. The authorized device(s) can include one or more device(s) such as, for example, first interactive device 205 that have been previously paired and authorized at the central device. For example, the authorized device(s) can be previously paired over one or more radio frequencies such as via a Bluetooth connection. The user identifier(s) 310 can identify one or more user(s) associated with the central device 215 and/or the one or more authorized device(s). For example, each of the user(s) can be associated with a user account. The user identifier(s) 310 can include a unique identifier corresponding to a respective user(s) account.

The home privilege(s) 315 can include one or more privileges associated with the home profile 300. For example, the home profile 300 can include an administrative account and the one or more home privileges 315 can include one or more administrative privileges. By way of example, home privilege(s) 315 can include one or more activities associated with the privacy or the security of the central device 215. For instance, the central device 215 can include a user's mobile device, a store's terminal device, a home networking device, and/or any other computing device. The home privilege(s) 315 can be tailored to the type of the device and/or privacy settings at the device.

By way of example, the central device 215 can include a user's mobile phone. In such a case, the home privilege(s) 315 can include accessing one or more contacts of the mobile phone, making a call and/or otherwise communicating (e.g., via a short message service) with another mobile phone, or accessing one or more other applications configured to run on the mobile phone. As another example, the central device 215 can include a store's terminal device. In such a case, the home privilege(s) 315 can include updating an inventory for the respective store, updating a price, handling returns, and/or making any other managerial decision. As one more example, the central device 215 can include a home networking device. In such a case, the home privilege(s) 315 can include accessing and/or controlling one or more device(s) (e.g., televisions, etc.), appliances (e.g., lighting appliances), or any other object communicatively paired to the central device 215.

Turning back FIG. 2, the first interactive object 205 can facilitate the pairing of a visitor interactive object 210 to the central device 215 such that the visitor interactive object 210 can interact with the central device 215 (and/or one or more other objects paired with the central device 215 such as the first interactive object 205) without having access to the home profile 300 (and/or the permissions 315 thereof) of the central device 215. To do so, a first user 225 of the first interactive object 205 can provide user input to the first interactive object 205. For example, the first interactive object 205 can detect user input with the first interactive object 205. The user input can include a physical contact (e.g., a touch input, squeezing action, etc.) with the first interactive object 205, a movement (e.g., a gesture, a particular movement pattern, etc.) of the first interactive object 205, an audio input (e.g., a voice command, etc.) to the first interactive object 205, etc.

In response to detecting the user input, the first interactive object 205 can initiate a listening mode associated with one or more sensors of the first interactive object 205. For instance, the listening mode can be associated with an infrared receiver of the first interactive object 205. The first interactive object 205 can receive, from one or more sensors such as the infrared receiver, data indicative of a visitor interactive object identifier associated with the visitor interactive object 210. The visitor interactive object identifier, for example, can include a unique identifier corresponding to a visitor interactive object 210 that is disconnected from the central device 215. For instance, the data indicative of the visitor interactive object identifier can include an infrared signal. In such a case, the first interactive object 205 can receive, from an infrared sensor, the data indicative of the visitor interactive object identifier during the listening mode. In addition, or alternatively, in some implementations, the first interactive object 205 can receive the data indicative of the visitor interactive object identifier regardless of a listening mode. For instance, the first interactive object 205 can include sensors that are constantly "listening" (e.g., sensors configured for duplex communication). In such a case, the sensor(s) can receive the data indicative of the visitor interactive object identifier without being put into a listening mode.

In some implementations, the visitor interactive object 210 can provide, at (230), the data indicative of the visitor interactive object identifier to the first interactive object 205. For example, a second user 230 of the visitor interactive object 210 can provide second user input (e.g., a physical contact, movement, audio input, etc.) to the visitor interactive object 210. In response, the visitor interactive object 210 can provide, at (230), the data indicative of the visitor interactive object identifier to the first interactive object 205. By way of example, the visitor interactive object 210 can be configured to provide, at (230), an infrared signal indicative of the visitor interactive object identifier to the first interactive object 205. The infrared signal can include a modulated infrared signal transmitted as a timed sequence of pulses. In this manner, the visitor interactive object identifier can be encoded within a frame of data transmitted from an infrared transmitter of the visitor interactive object. The frame of data can be received and decoded by the first interactive object to obtain the visitor interactive object identifier.

In some implementations, the visitor interactive object 210 can determine a connection status associated with the visitor interactive object 210 and provide the data indicative of the visitor interactive object identifier to the first interactive object 205 based on the connection status. The connection status, for example, can identify whether the visitor interactive object 210 is associated with an active wireless connection to another device (e.g., another central device such as a mobile phone, etc.). In the event that the visitor interactive object 210 is associated with an active wireless connection, the connection status can include a connected status. In the event that the visitor interactive object 210 is not associated with an active wireless connection, the connection status can include a disconnected status.

In some implementations, the visitor interactive object 210 can provide, at (230), the data indicative of the visitor interactive object identifier to the first interactive object 205 in the event that the visitor interactive object 210 is in a disconnected status (e.g., disconnected from any other central device).

The first interactive object 205 can generate a pairing communication for the visitor interactive object 210 and the central device 215. The pairing communication can include the visitor interactive object identifier. The pairing communication, for example, can include a radio wave advertising packet such as a BLE advertising packet and/or any other packet including information for pairing the visitor interactive object 210 to the central device 215. The first interactive object 205 can communicate, at (240), via the established wireless connection 250 with the central device 215, the pairing communication to the central device 215. In this manner, the central device 215 can receive a visitor pairing communication with the information required to pair with the visitor interactive object 210.

For instance, the central device 215 can receive the visitor pairing communication from the first interactive object 205 wirelessly connected to the central device 215. The central device 215 can utilize the information of the pairing communication such as, for example, the visitor interactive object identifier to establish, at (245), a second wireless connection 255 with the visitor interactive object 210. For instance, in some implementations, the pairing communication can be configured to trigger the central device 215 to establish, at (245), a temporary wireless connection 255 with the visitor interactive object 210. The central device 215 can receive the pairing communication and, in response, establish, at (245), the temporary wireless connection 245 with the visitor interactive object 210. In this manner, the central device 215 can be temporarily paired with the visitor interactive object 210 based, at least in part, on the pairing communication.

Figure 4:
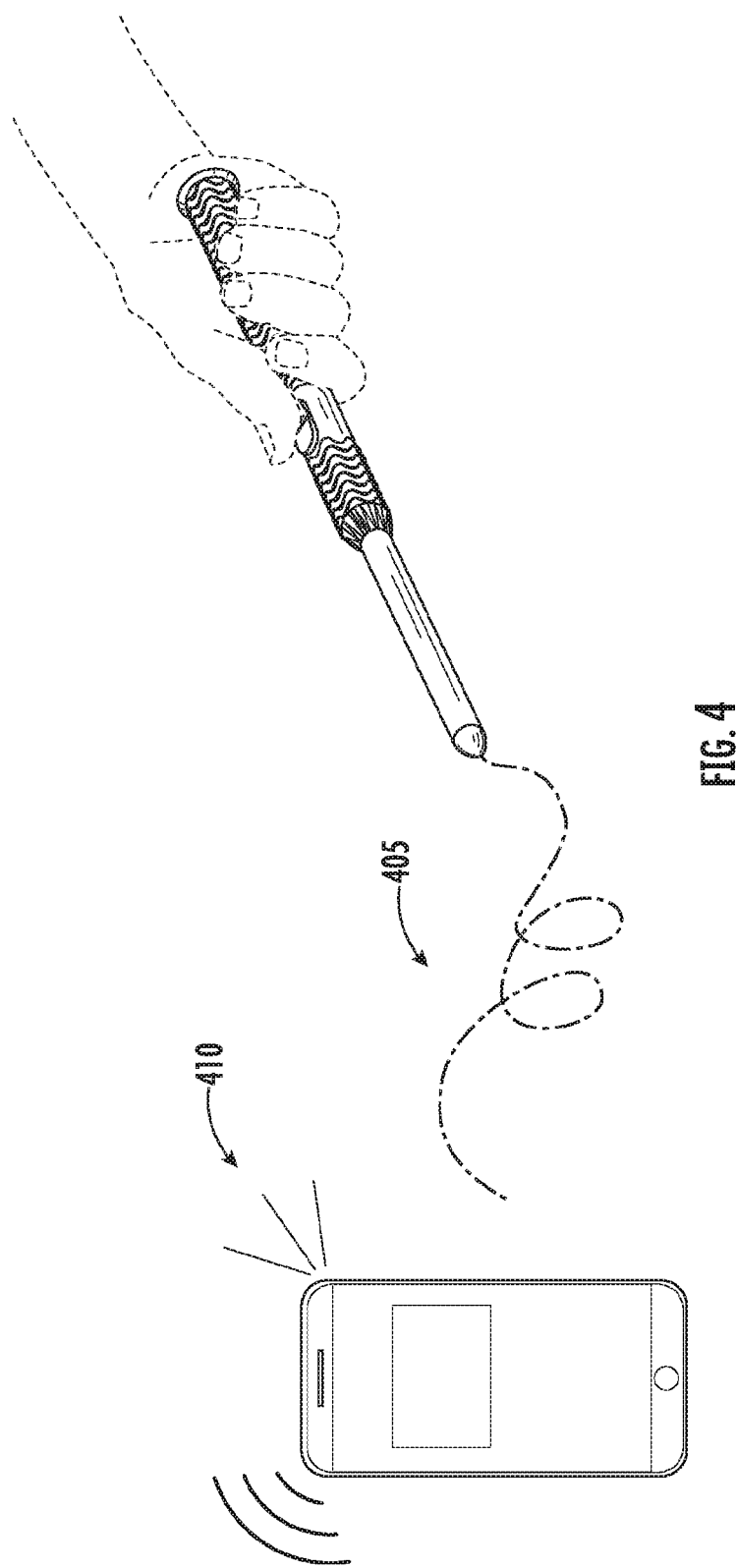
FIG. 4 depicts an example interactive object action according to example aspects of the present disclosure.

Once paired, the interactive object(s) 205, 210 can leverage the computing resources of the central device 215 to perform one or more functions. For instance, FIG. 4 depicts an example interactive object action 405 according to example aspects of the present disclosure. A user can physically move an interactive object to perform the interactive object action 405. The interactive object action 405 can include, for example, a gesture action. The gesture action can represent a spell-like motion associated with an interactive toy wand. While in motion, the interactive object can obtain sensor data (e.g., via the inertial measurement unit(s) of the interactive object, etc.) that indicates the position(s) and/or time(s) associated with the motion of the interactive object. In some implementations, this data can be expressed as a series of coordinate point(s) (e.g., 2D x-y coordinates, etc.) and time(s) (e.g., time durations from a to, timestamps associated with a world clock, etc.). The interactive object can provide, to a connected device such as the central device discussed herein, data indicative of the interactive object action 405. This can include, for example, the coordinates and/or times associated with the gesture action, etc.

The connected device (e.g., central device 405) can perform one or more action(s) 410 based at least in part on the interactive object action and/or the interactive object (e.g., the first interactive object 205, the visitor interactive object 210, of FIG. 2) that provided the data indicative of the interactive object action. For instance, the central device can obtain the data indicative of the interactive object action (e.g., the gesture action, etc.). The central device can process the data to identify the interactive object action and an associated central device action to be performed. By way of example, the central device can input the coordinates/times associated with the gesture action into a recognizer model. The recognizer model can be configured to analyze the coordinates/times to identify the particular interactive object action performed via the interactive object(s). For example, the data input into the recognizer model can be indicative of three-dimensional motion data generated by the interactive object (e.g., inertial measurement unit data, accelerometer data, X-Y-Z coordinate data, with associated times, etc.). The recognizer model can be configured to flatten the three-dimensional coordinates into a two-dimensional representation (e.g., by viewing the sequence via a common view plane, etc.). The two-dimensional representation can be matched to a stored gesture motion library (e.g., to identify a particular gesture within a particular confidence range, etc.) to determine an interactive object action (e.g., a gesture, etc.) intended by a user. The recognizer model can output data indicative of the identified interactive object action. The central device (e.g., a software application running on the device, etc.) can identify one of more functions to perform based at least in part on the interactive object action identified by the recognizer model.

For example, the central device (e.g., a software application running on the device, etc.) can perform a central device action 410 based at least in part on the interactive object action 405 identified by the recognizer model and/or the interactive object (e.g., the first interactive object 205, the visitor interactive object 210, of FIG. 2) that provided the data indicative of the interactive object action.

By way of example, the user device can perform a look-up function to determine what action the user device is to take in response to the interactive object action 405. In this manner, the central device can identify one or more functions associated with the physical movement of a paired interactive object. The central device can invoke at least one of the one or more functions based, at least in part, on the interactive object (e.g., the first interactive object 205, the visitor interactive object 210, of FIG. 2) that provided the data indicative of the interactive object action 405. For instance, the one or more functions can include ignoring the interactive object action 405 (e.g., based on permissions associated with the interactive object that provided the data) and/or responding with a particular central device action 410. By way of example, a central device action can include initiating an action associated with a collaborative game, adjusting the volume of the another device, purchasing an item via an e-commerce application, activating a lighting source of the another device, capturing an image, initiating a communication (e.g., phone call, telephone call, etc.), emitting sound(s), sending a communication to adjust a parameter of another device (e.g., tuning on a home device, changing the channel of a smart television, etc.), and/or other types of functions. The central device can determine whether to initiate a specific based, at least in part, on the permissions associated with the interactive object that provided the data indicative of the interactive object action 405

Figure 5:
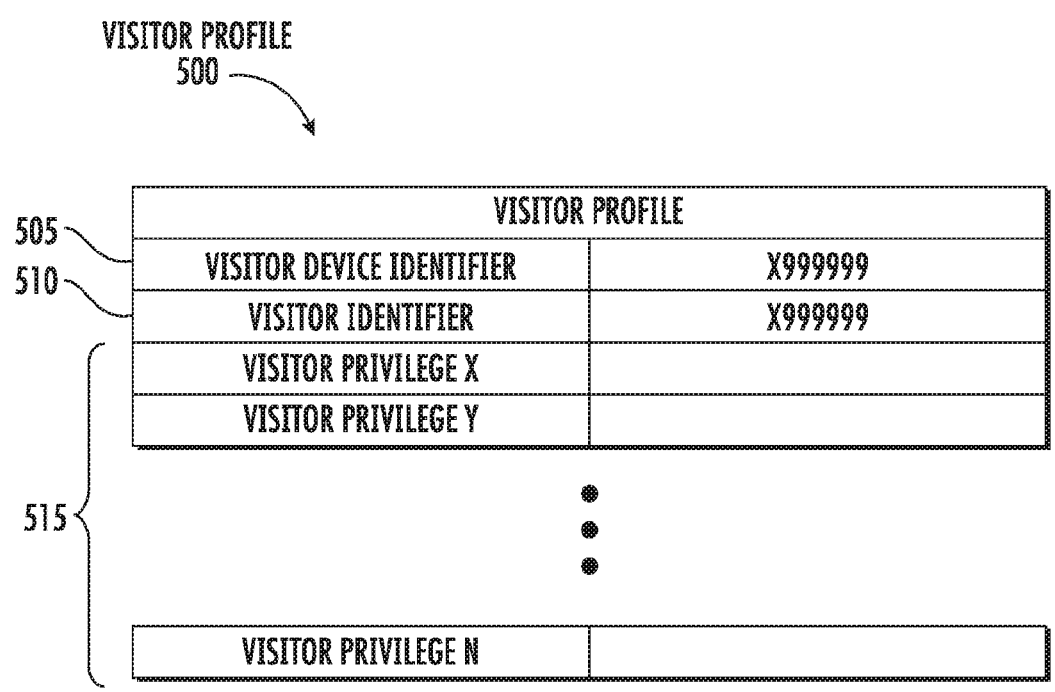
FIG. 5 depicts example contents of a visitor profile according to example aspects of the present disclosure.

For example, the central device can generate, based at least in part on the visitor interactive object identifier, a temporary visitor profile for a visitor interactive object. FIG. 5, for example, depicts example contents of a visitor profile 500 according to example aspects of the present disclosure. The visitor profile 500 can include one or more device identifiers 505, visiting user identifiers 510, and/or visitor privileges 515. The device identifiers 505, for example, can identify a unique identifier for the visitor interactive object (e.g., visitor interactive object identifier). The visiting user identifier(s) 510 can identify one or more user(s) associated with the visitor interactive object. For example, each of the user(s) can be associated with a user account. The user identifier(s) 510 can include a unique identifier corresponding to a respective user account. The central device, for example, can perform a lookup (e.g., on a cloud-based memory) for one or more users associated with the device identifier 505.

In addition, the visitor profile 500 can include one or more visitor privileges 515 associated with the visitor interactive object. The one or more visitor privileges 515 can be different from the one or more home privileges associated with the first interactive object. For example, the one or more visitor privileges 515 can be based, at least in part, on a user account associated with a user of the visitor interactive object. For instance, the central device can generate the temporary visitor profile 500 by identifying (e.g., by searching a cloud database, etc.) a user account associated with the visitor interactive object identifier. In some implementations, the one or more visitor privileges 515 can be associated with at least one of an age of the user, a status (e.g., a level in a collaborative game, a delinquency status, etc.) of the user, and/or a history (e.g., a purchase history, etc.) of the user as indicated by a user account. In addition, or alternatively, the visitor privilege(s) 515 can include restrictions based on the one or more home privileges. For instance, the one or more home privileges can include one or more exclusive home privileges such that any visitor interactive object connected with the central device will not be granted the one or more exclusive home privileges.

Turning back to FIG. 2, the central device 215 can receive interaction data indicative of an interactive object action for at least one of the first interactive object 205 (e.g., via wireless connection 250) and/or the visitor interactive object 210 (e.g., via temporary wireless connection 255). The central device 215 can identify the interactive object that performed the interactive object action based, at least in part, on the interaction data (e.g., via an interactive object identifier of the interaction data). And, the central device 215 can initiate a response to the interactive object action based on the interactive object that performed the interactive object action. For example, the response can be determined based at least in part on the privileges associated with the profile associated with the interactive object that performed the interactive object action.

As an example, the interactive object can be the visitor interactive object 210. In such a case, the central device 215 can determine a visitor response to the interactive object action based at least in part on the one or more visitor privileges of the visitor profile associated with the visitor interactive object and initiate the visitor response to the object action. As another example, the interactive object can be the first interactive object 205. In such a case, the central device 215 can determine a home response to the interactive object action based at least in part on the one or more home privileges of the home profile associated with the first interactive object 215 and initiate the home response to the object action. The visitor response can be different from the home response, for example, in the event that a visitor profile does not include privileges for performing an action accessible to the home profile.

The central device 215 can terminate the temporary wireless connection 255 with the visitor interactive object 210 based on one or more factors such as, for example, a location associated with the visitor interactive object 210 (e.g., indicating that the visitor interactive object is out of range, etc.), a time period (e.g., the expiration of a pairing time period, etc.), an event (e.g., the completion of a collaborative game, etc.), and/or any other factor that may affect the connection between two devices. In response to terminating the temporary wireless connection 255, the central device 215 can discard the temporary visitor profile. In addition, or alternatively, the temporary visitor profile can be stored in an accessible memory at the central device.

Figure 6:
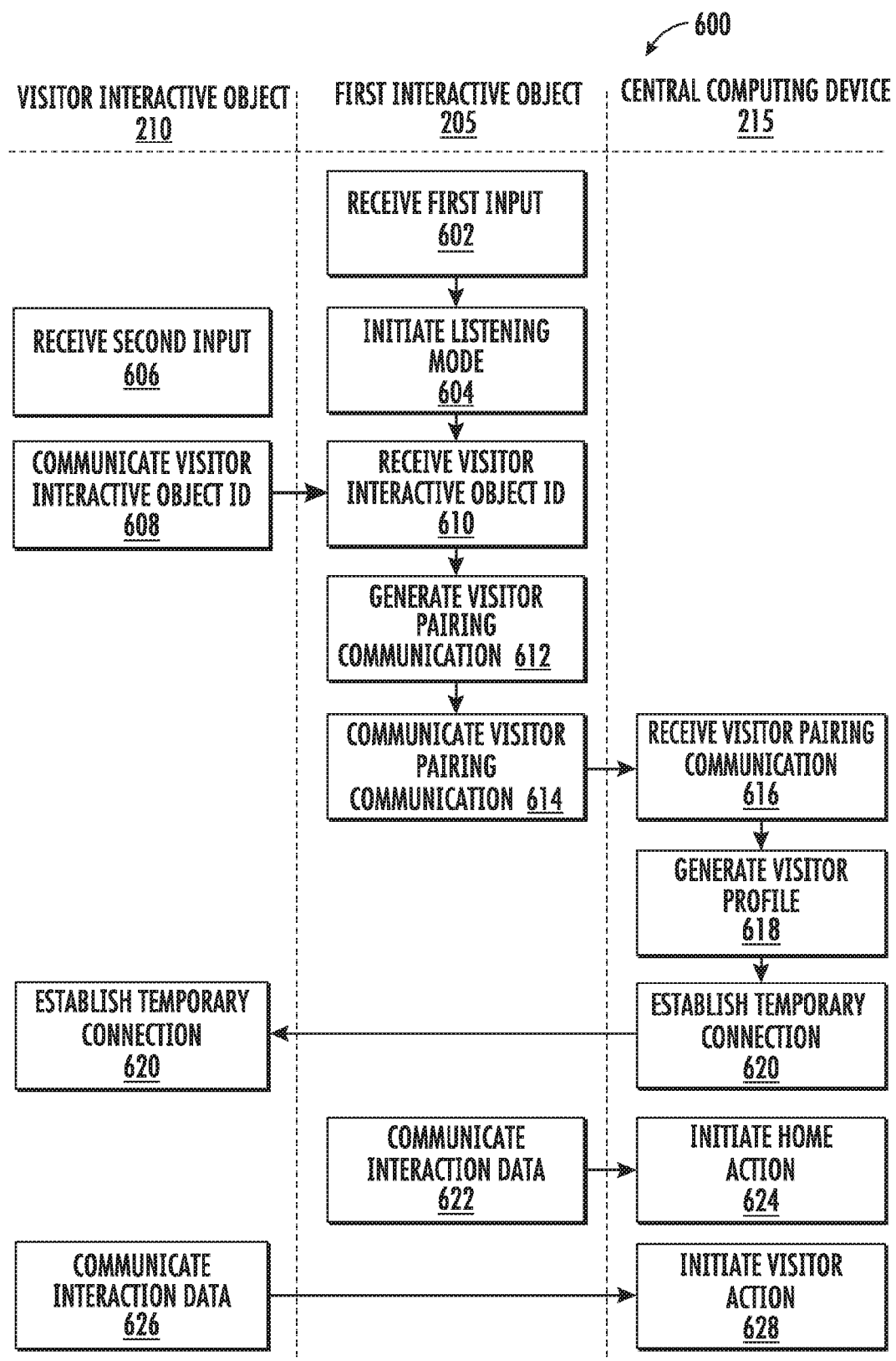
FIG. 6 depicts an example activity diagram for pairing devices according to example aspects of the present disclosure.

FIG. 6 depicts an example activity diagram 600 for pairing devices according to example aspects of the present disclosure. The activity diagram 600 depicts interaction between visitor interactive object 210, first interactive object 205, and central device 215. In some implementations, the central computing device 215 can include a mobile phone, a store device, or a home-networking device. The first interactive object 205 and the visitor interactive object 210 can include an interactive toy with a wand-like form factor. In addition, or alternatively, the interactive objects 205, 210 can include another mobile device such as a mobile phone, and/or any other device with wireless capabilities.

The first interactive object 205 can be wirelessly connected to the central computing device 215. For instance, the first interactive object 205 can be previously paired with the central computing device 215. The first interactive object 205 can be authorized for input to the central computing device 215 based on a user profile of the central computing device 215. For instance, the first interactive object 205 can be associated with a home profile including one or more home privileges associated with the first interactive object 205.

At (602), the first interactive object 205 can receive a first input. For instance, the first interactive object 205 can detect a user input with the first interactive object 205. The first input can include a physical contact with the first interactive object 205, a movement of the first interactive object 205, an audio input to the first interactive object 205, and/or any other user input detectable by the first interactive object 205. In response to detecting the user input, at (604), the first interactive object 205 can initiate a listening mode associated with a sensor (e.g., infrared receiver) of the first interactive object 205.

At (606), the visitor interactive object 210 can receive a second input. For instance, the visitor interactive object 210 can detect a user input with the visitor interactive object 210. The second input can include a physical contact with the visitor interactive object 210, a movement of the visitor interactive object 210, an audio input to the visitor interactive object 210, and/or any other user input detectable by the visitor interactive object 210. In response to detecting the second user input, at (608), the visitor interactive object 210 can communicate data indicative of a visitor interactive object identifier associated with the visitor interactive object 210 to the first interactive object 205.

At (610), the first interactive object 205 can receive, from one or more sensors, data indicative of the visitor interactive object identifier associated with the visitor interactive object 210. For example, the one or more sensors can include an infrared receiver. In such a case, the data indicative of the visitor interactive object identifier can include an infrared signal. In some implementations, the first interactive object 205 can receive, from the infrared sensor, the data indicative of the visitor interactive object identifier during the listening mode.

At (612), the first interactive object 205 can generate a visitor pairing communication. For instance, the first interactive object 205 can generate a pairing communication for the visitor interactive object 210 and the central device 215. The pairing communication can include the visitor interactive object identifier. At (614), the first interactive object 205 can communicate the pairing communication to the central computing device 215. The central computing device 215 can be temporarily paired with the visitor interactive object 210 based, at least in part, on the pairing communication. For instance, the pairing communication can be configured to trigger the central computing device 215 to establish a temporary wireless connection with the visitor interactive object 210.

For example, at (616), the central device 215 can receive the visitor pairing communication. For instance, the central device 215 can receive the visitor pairing communication from the first interactive object 205 wirelessly connected to the central computing device 215. The visitor pairing communication can include the visitor interactive object identifier associated with a visitor interactive object 210.

At (618), the central device 215 can generate, based at least in part on the visitor interactive object identifier, a temporary visitor profile for the visitor interactive object 210. The temporary visitor profile can include one or more visitor privileges associated with the visitor interactive object 210. In some implementations, the one or more home privileges can be different from the one or more visitor privileges. In addition, or alternatively, the visitor privileges can include the one or more home privileges. The one or more visitor privileges can be based, at least in part, on a user account associated with a user of the visitor interactive object 210. For example, the one or more visitor privileges can be associated with at least one of an age of the user, a status of the user, and/or a history of the user.

At (620), the central device 215 can establish, based at least in part on the visitor pairing communication, a temporary wireless connection with the visitor interactive object 210. Once paired, the central device 215 can receive interaction data indicative of an interactive object action. The interactive object action can include a physical movement of an interactive object 205, 210. The central device 215 can identify, based, at least in part, on the interaction data, the interactive object 205, 210 and initiate, based, at least in part, on the interactive object, a response to the interactive object action. For instance, the central device 215 can identify one or more functions associated with the physical movement of the interactive object 205, 210 and invoke at least one of the one or more functions.

As an example, at (622), the first interactive object 205 can communicate interaction data to the central device 215. The central device 215 can determine that the interactive object is the first interactive object 205. In response, the central device 215 can determine, based at least in part on the one or more home privileges, a home response to the interactive object action. At (626), the central device 215 can initiate the home response to the interactive object action.

As another example, at (624), the visitor interactive object 210 can communicate interaction data to the central device 215. The central device 215 can determine that the interactive object is the visitor interactive object 210. In response, the central device 215 can determine, based at least in part on the one or more visitor privileges, a visitor response to the interactive object action. At (628), the central device 215 can initiate the visitor response to the interactive object action. The visitor response can be the same or different from the home response.

The central device 215 can terminate, based at least in part on a location or other factor associated with the visitor interactive object 210, the temporary wireless connection with the visitor interactive object 210. In response to terminating the temporary wireless connection, the central device 215 can discard the temporary visitor profile.

Figure 7:
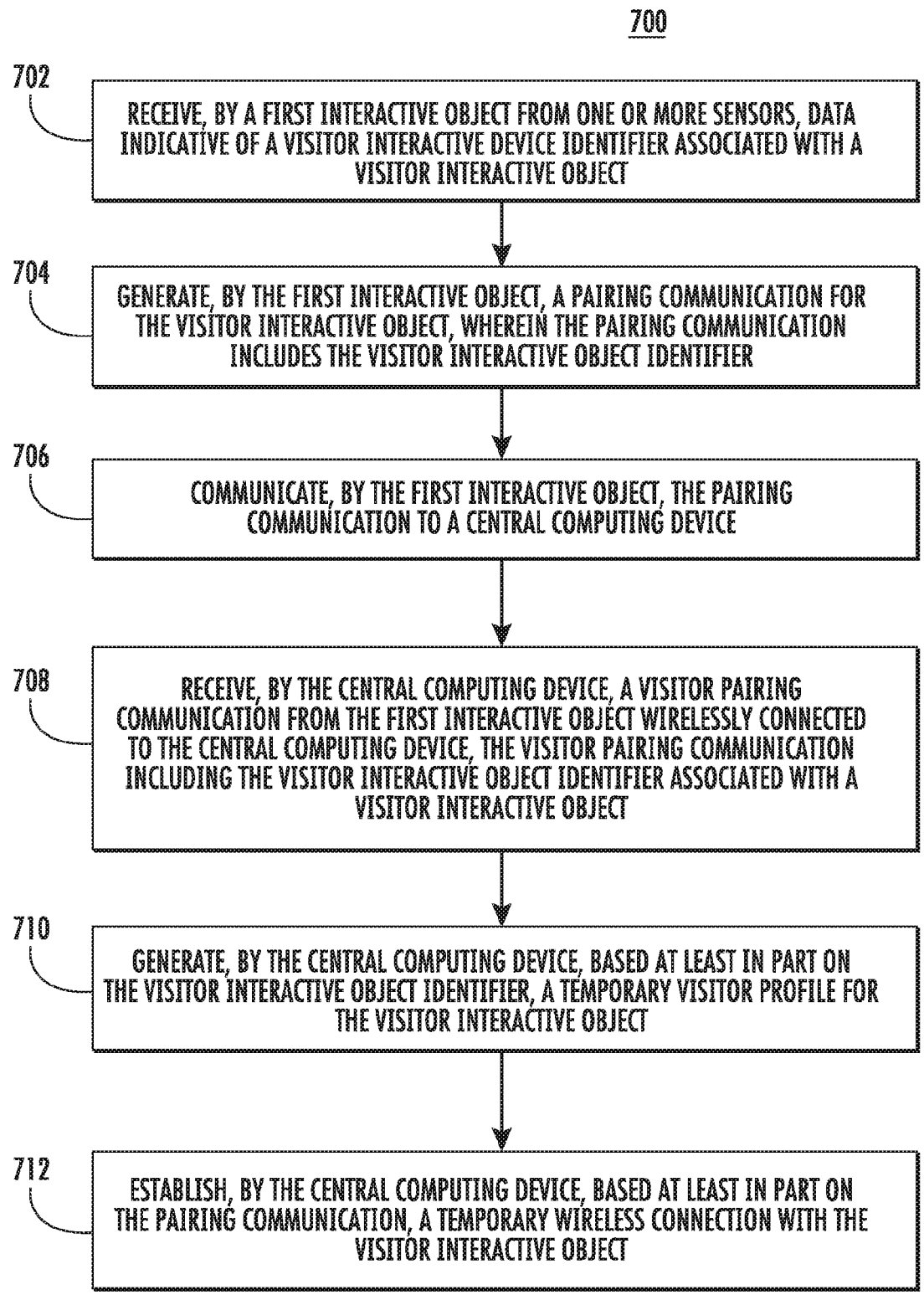
FIG. 7 depicts an example method for pairing device according to example aspects of the present disclosure.

FIG. 7 depicts an example method 700 for pairing devices according to example aspects of the present disclosure. One or more portion(s) of method 700 can be implemented by one or more computing device(s) such as, for example, those shown in FIGS. 1, 2, 5, and 7. Moreover, one or more portion(s) of the method 400 can be implemented as an algorithm on the hardware components of the device(s) described herein (e.g., as in FIGS. 1, 2, 4, 6, and 8) to, for example, pair electronic devices. FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (702), the method 700 can include receiving, by a first interactive object from one or more sensors, data indicative of a visitor interactive object identifier associated with a visitor interactive object. For example, a first interactive object can receive the data indicative of the visitor interactive object identifier associated with a visitor interactive object.

At (704), the method 700 can include generating, by the first interactive object, a pairing communication for the visitor interactive object. For example, the first interactive object can generate the pairing communication for the visitor interactive object. The pairing communication can include the visitor interactive object identifier.

At (706), the method 700 can include communicating, by the first interactive object, the pairing communication to a central computing device. For example, the first interactive object can communicate the pairing communication to the central computing device. The central computing device can be temporarily paired with the visitor interactive object based, at least in part, on the pairing communication.

At (708), the method 700 can include receiving, by the central computing device, a visitor pairing communication from the first interactive object wirelessly connected to the central computing device. For example, the central computing device can receive the visitor pairing communication from the first interactive object. The visitor pairing communication can include a visitor interactive object identifier associated with the visitor interactive object.

At (710), the method 700 can include generating, by the central computing device, based at least in part on the visitor interactive object identifier, a temporary visitor profile for the visitor interactive object. For example, the central computing device can generate the temporary visitor profile for the visitor interactive object.

At (712), the method 700 can include establishing, by the central computing device, based at least in part on the pairing communication, a temporary wireless connection with the visitor interactive object. For example, the central computing device can establish the temporary wireless connection with the visitor interactive object.

Figure 8:
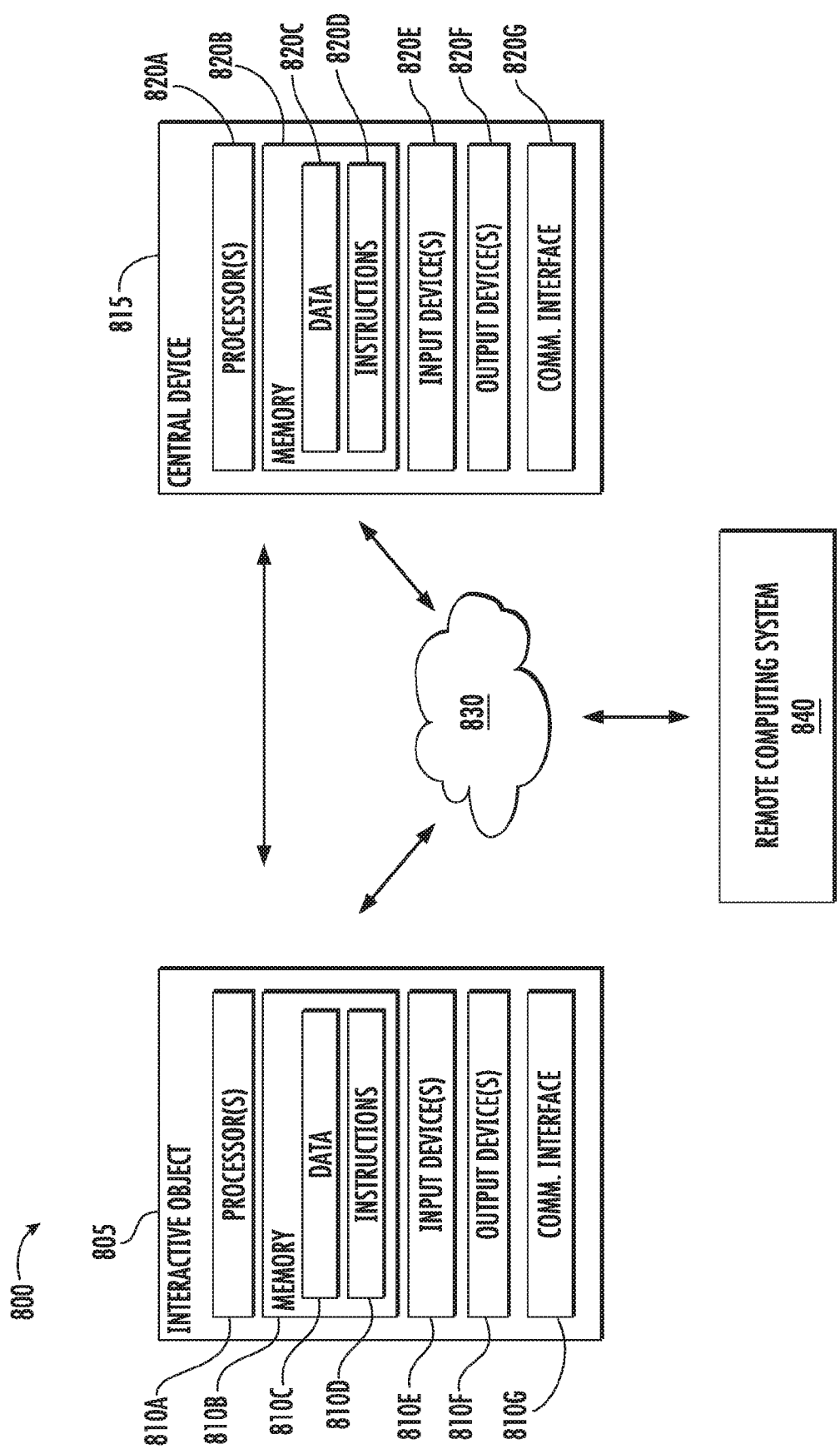
FIG. 8 depicts example components of an example computing system according to example aspects of the present disclosure.

FIG. 8 depicts example components of an example computing system 800 according to example aspects of the present disclosure. The system 800 can include an interactive object 805, a central device 815, and a remote computing system 840. The interactive object 805 and central device(s) 815 can correspond to interactive objects 100, 205, 210 and central device 215, as described herein. The interactive object 805 and the central device 815 can communicate via one or more near range communication protocols (e.g., BLE, infrared signals, etc.). In some implementations, the system 800 can include one or more remote computing systems 840 (e.g., cloud-based server systems, etc.). The interactive object 805, the central device 815, and/or the remote computing computing(s) 840 can be configured to communicate via one or more network(s) 830.

The interactive object 805 can include one or more computing device(s). The computing device(s) can include one or more processor(s) 810A and one or more memory device(s) 810B. The one or more processor(s) 810A can be any suitable processing device (e.g., a processor core, a microprocessor, an ASIC, a FPGA, a controller, a microcontroller, etc.) and can be one processor or a plurality of processors that are operatively connected. The memory device(s) 810B can include one or more non-transitory, computer-readable media that collectively store instructions that when executed by the one or more processors 810A (the interactive object 805) cause the one or more processors 810A (the interactive object 805) to perform operations. The memory device(s) 810B can include one or more non-transitory, computer-readable storage media, such as RAM, ROM, EEPROM, EPROM, flash memory devices, magnetic disks, etc., and/or combinations thereof.

The memory device(s) 810B can store information accessible by the one or more processor(s) 810A, including computer-readable instructions 810D that can be executed by the one or more processor(s) 810A. The instructions 810D can be any set of instructions that when executed by the one or more processor(s) 810A, cause the one or more processor(s) 810A (the interactive object 805) to perform operations. In some embodiments, the instructions 810D can be executed by the one or more processor(s) 810A to cause the one or more processor(s) 810A (the interactive object 805) to perform operations, such as any of the operations and functions of an interactive object (and/or its hardware components) or for which the interactive object 805 (and/or its hardware components) are configured, as described herein, one or more portions of any of the methods/processes described herein (e.g., methods 600, 700), and/or any other operations or functions, as described herein. The instructions 810D can be software written in any suitable programming language or can be implemented in hardware. Additionally, and/or alternatively, the instructions 810D can be executed in logically and/or virtually separate threads on processor(s) 810A.

The one or more memory device(s) 810B can also store data 810D that can be retrieved, manipulated, created, or stored by the one or more processor(s) 810A. The data 810D can include, for instance, data indicative of user input, data indicative of a pairing communication, data indicative of an interactive object identifier, data indicative of a paring output signal, sensor data, data indicative of an interactive object action, data associated with an unpairing action, algorithms and/or models, and/or other data or information. The data 810D can be stored in one or more database(s). The one or more database(s) can be connected to the interactive object 805 by a data channel, by a high bandwidth LAN or WAN, or can also be connected to the interactive object 805 through network(s) 830. The one or more database(s) can be split up so that they are located in multiple locales.

The interactive object 805 can also include a communication interface 810G used to communicate with one or more other component(s) of the system 800 including, for example, near range and/or over the network(s) 830. The network interface 810G can include any suitable components for interfacing with one or more network(s), including for example, transmitters, receivers, ports, controllers, antennas, chips, or other suitable components.

The interactive object 805 can include one or more input devices(s) 810E and/or one or more output devices(s) 810E. The input devices(s) 810E can include, for example, hardware and/or software for receiving information from a user (e.g., user input) and/or another device. This can include, for example, one or more sensors (e.g., infrared receivers, inductive sensors, IMUs, etc.), buttons, touch screen/pad, data entry keys, a microphone suitable for voice recognition, etc. The output device(s) 810F can include hardware and/or software for visually or audibly producing signals. For instance, the output device(s) 810F can include one or more infrared transmitters, lighting elements (e.g., LED, etc.), display device, one or more speaker(s), etc.

The central device 815 can be any suitable type of computing device, as described herein. A central device 815 can include one or more processor(s) 820A and one or more memory device(s) 820B. The one or more processor(s) 820A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 820B can include one or more non-transitory, computer-readable media that collectively store instructions that when executed by the one or more processors 820A (the central device 815) cause the one or more processors 820A (the central device 815) to perform operations. The memory device(s) 820B can include one or more non-transitory, computer-readable storage media, such as RAM, ROM, EEPROM, EPROM, flash memory devices, magnetic disks, etc., and/or combinations thereof.

The memory device(s) 820B can include one or more computer-readable media and can store information accessible by the one or more processor(s) 820A, including instructions 820D that can be executed by the one or more processor(s) 820A. For instance, the memory device(s) 820B can store instructions 820D for running one or more software applications, displaying a user interface, receiving user input, processing user input, pairing/impairing with an interactive object, performing user device actions, etc. The instructions 820B can be executed by the one or more processor(s) 820A to cause the one or more processor(s) 820A (the central device 815) to perform operations, one or more portions of any of the methods/processes described herein (e.g., method 600, 700), and/or any other operations or functions, as described herein, as described herein. The instructions 820D can be software written in any suitable programming language or can be implemented in hardware. Additionally, and/or alternatively, the instructions 820D can be executed in logically and/or virtually separate threads on processor(s) 820A.

The one or more memory device(s) 820B can also store data 820C that can be retrieved, manipulated, created, or stored by the one or more processor(s) 820A. The data 820C can include, for instance, data indicative of a user input, data indicative of user input, data indicative of a pairing communication, data indicative of an interactive object identifier, data indicative of a pairing output signal, sensor data, data indicative of an interactive object action, data associated with an impairing action, data indicative of home profile and/or one or more home privileges, data indicative of a visitor profile and/or one or more visitor privileges, algorithms and/or models, and/or other data or information. In some implementations, the data 820C can be received from another device.

The central device 815 can also include a network interface 820G used to communicate with one or more other component(s) of system 800 (e.g., an interactive object 805) via near range communication and/or over the network(s) 830. The network interface 820G can include any suitable components for interfacing with one or more network(s), including for example, transmitters, receivers, ports, controllers, antennas, or other suitable components.

The central device 815 can include one or more input devices(s) 820E and/or one or more output devices(s) 820E. The input devices(s) 820E can include, for example, hardware and/or software for receiving information from a user, such as a touch screen, touch pad, mouse, data entry keys, speakers, a microphone suitable for voice recognition, etc. In some implementations, the input device(s) 820E can include sensor(s) for capturing sensor data (E.g., associated with a pairing output signal, interactive object action, etc.). The output device(s) 820F can include hardware and/or software for visually or audibly producing information/signals for a user. For instance, the output device(s) 820F can include one or more speaker(s), earpiece(s), headset(s), handset(s), etc. The output device(s) 820F can include a display device, which can include hardware for displaying a user interface and/or messages for a user. By way of example, the output component 820F can include a display screen, CRT, LCD, plasma screen, touch screen, TV, projector, and/or other suitable display components. In some implementations, the central device 815 may not include a display device.

The network(s) 830 can be any type of communications network, such as a local area network (e.g. intranet), wide area network (e.g. Internet), cellular network, or some combination thereof and can include any number of wired and/or wireless links. The network(s) 830 can also include a direct connection between one or more component(s) of system 800. In general, communication over the network(s) 830 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for device pairing, comprising, by a central computing device:
receiving a visitor pairing communication from a first interactive object wirelessly connected to the central computing device, the visitor pairing communication comprising a visitor interactive object identifier associated with a visitor interactive object;
generating a temporary visitor profile for the visitor interactive object based at least in part on the visitor interactive object identifier;
receiving, interaction data indicative of an interactive object action, the interactive object action comprising a physical movement of the first interactive object or the visitor interactive object;
identifying, based at least in part on the interaction data, the first interactive object or the visitor interactive object; and
initiating, based at least in part on an identification of the first interactive object or the visitor interactive object, a response to the interactive object action.

2. The computer-implemented method of claim 1, wherein the first interactive object is wirelessly connected to the central computing device.

3. The computer-implemented method of claim 1, wherein the first interactive object is previously paired with the central computing device, the first interactive object being authorized for input to the central computing device based on a user profile of the central computing device.

4. The computer-implemented method of claim 1, wherein the pairing communication is configured to trigger the central computing device to establish a temporary wireless connection with the visitor interactive object.

5. The computer-implemented method of claim 1, wherein the one or more sensors comprise an infrared receiver, and wherein the data indicative of the visitor interactive object identifier comprises an infrared signal.

6. The computer-implemented method of claim 5, wherein receiving the data indicative of the visitor interactive object identifier comprises:
detecting, by the first interactive object, user input with the first interactive object;
in response to detecting the user input, initiating, by the first interactive object, a listening mode associated with the infrared receiver of the first interactive object; and
receiving, by the first interactive object from the infrared sensor, the data indicative of the visitor interactive object identifier during the listening mode.

7. The computer-implemented method of claim 6, wherein the user input comprises at least one of:
a physical contact with the first interactive object;
a movement of the first interactive object; or
an audio input to the first interactive object.

8. The computer-implemented method of claim 1, wherein the central computing device comprises a mobile phone.

9. The computer-implemented method of claim 1, wherein the first interactive object and the visitor interactive object comprise a wand-like form factor.

10. A central computing device, comprising:
one or more processors; and
a memory storing instructions that when executed by the one or more processors cause the central computing device to perform operations comprising:
receiving a visitor pairing communication from a first interactive object wirelessly connected to the central computing device, the visitor pairing communication comprising a visitor interactive object identifier associated with a visitor interactive object;
generating, based at least in part on the visitor interactive object identifier, a temporary visitor profile for the visitor interactive object;
establishing, based at least in part on the visitor pairing communication, a temporary wireless connection with the visitor interactive object;
receiving interaction data indicative of an interactive object action, the interactive object action comprising a physical movement of the first interactive object or the second interactive object;
identifying, based at least in part on the interaction data, the first interactive object or the second interactive object; and
initiating, based, at least in part, on an identification of the first interactive object or the second interactive object, a response to the interactive object action.

11. The central computing device of claim 10, wherein the first interactive object is associated with a home profile comprising one or more home privileges associated with the first interactive object, and wherein the temporary visitor profile comprises one or more visitor privileges associated with the visitor interactive object.

12. The central computing device of claim 11, wherein the one or more home privileges are different from the one or more visitor privileges.

13. The central computing device of claim 12, wherein the one or more visitor privileges are based, at least in part, on a user account associated with a user of the visitor interactive object.

14. The central computing device of claim 13, wherein the one or more visitor privileges are associated with at least one of an age of the user, a status of the user, or a history of the user.

15. The central computing device of claim 11, wherein the operations further comprise:
terminating, based at least in part on a location associated with the visitor interactive object, the temporary wireless connection with the visitor interactive object; and
in response to terminating the temporary wireless connection, discarding the temporary visitor profile.

16. The central computing device of claim 10, wherein the response to the interactive object action comprises:
identifying one or more functions associated with the physical movement of the interactive object; and
invoking at least one of the one or more functions.

17. The central computing device of claim 10, wherein the identification is of the first interactive object, and wherein initiating the response to the interactive object action comprises:
determining, based at least in part on the one or more home privileges, a home response to the interactive object action; and
initiating the home response to the interactive object action.

18. The central computing device of claim 17, wherein a subsequent identification is of the visitor interactive object, the method further comprising:
determining, based at least in part on the one or more visitor privileges, a visitor response to a subsequent interactive object action, wherein the visitor response is different from the home response; and
initiating the visitor response to the subsequent interactive object action.

19. One or more non-transitory computer-readable media comprising instructions that when executed by one or more computing devices cause the one or more computing devices to perform operations comprising, by a central computing device:
  receiving a visitor pairing communication from a first interactive object wirelessly connected to the central computing device, the visitor pairing communication comprising a visitor interactive object identifier associated with a visitor interactive object;
  generating a temporary visitor profile for the visitor interactive object based at least in part on the visitor interactive object identifier;
  receiving, interaction data indicative of an interactive object action, the interactive object action comprising a physical movement of the first interactive object or the visitor interactive object;
  identifying, based at least in part on the interaction data, the first interactive object or the visitor interactive object; and
  initiating, based at least in part on an identification of the first interactive object or the visitor interactive object, a response to the interactive object action.

* * * * *